United States Patent
Kats et al.

(10) Patent No.: US 11,245,726 B1
(45) Date of Patent: Feb. 8, 2022

(54) SYSTEMS AND METHODS FOR CUSTOMIZING SECURITY ALERT REPORTS

(71) Applicant: Symantec Corporation, Mountain View, CA (US)

(72) Inventors: Daniel Kats, Culver City, CA (US); Kevin Roundy, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 981 days.

(21) Appl. No.: 15/945,736

(22) Filed: Apr. 4, 2018

(51) Int. Cl.
*H04L 29/06* (2006.01)
*G06N 20/00* (2019.01)

(52) U.S. Cl.
CPC ............ *H04L 63/20* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,775,332 | B1 * | 7/2014 | Morris | G06N 5/02 706/11 |
| 2017/0011308 | A1 * | 1/2017 | Sun | G06F 11/00 |
| 2017/0032268 | A1 * | 2/2017 | Rajagopalan | G06Q 10/00 |
| 2017/0063920 | A1 * | 3/2017 | Thomas | H04L 63/1408 |
| 2017/0261954 | A1 * | 9/2017 | Li | G05B 19/042 |
| 2017/0353477 | A1 * | 12/2017 | Faigon | G06F 21/6209 |
| 2018/0018590 | A1 * | 1/2018 | Szeto | G06F 21/6254 |
| 2018/0025287 | A1 * | 1/2018 | Mathew | G06N 20/00 706/12 |
| 2018/0027006 | A1 * | 1/2018 | Zimmermann | H04L 63/0245 726/11 |
| 2018/0189499 | A1 * | 7/2018 | Perera | G06F 21/577 |
| 2018/0211045 | A1 * | 7/2018 | Abukhovsky | G06F 21/577 |
| 2018/0239500 | A1 * | 8/2018 | Allen | G06F 3/0481 |
| 2019/0042981 | A1 * | 2/2019 | Bendfeldt | G06F 9/451 |

OTHER PUBLICATIONS

"Configure Alerts for Endpoint Protection in Configuration Manager". Posted at <https://docs.microsoft.com/en-us/mem/configmgr/protect/deploy-use/endpoint-configure-alerts> on Mar. 23, 2017. (Year: 2017).*

* cited by examiner

*Primary Examiner* — Scott B Christensen
(74) *Attorney, Agent, or Firm* — FisherBroyles, LLP

(57) ABSTRACT

The disclosed computer-implemented method for customizing security alert reports may include (i) identifying a local machine learning model that predicts how a client responds to security alerts generated for the client, (ii) identifying a set of peer machine learning models that predict how a set of peers of the client each responds to security alerts generated for each respective peer, (iii) measuring a level of similarity between the client and each respective peer of the set of peers according to a similarity metric to create a similarity model, (iv) aggregating the local machine learning model and at least one of the set of peer machine learning models based on the similarity model to create an aggregated machine learning model, and (v) protecting the client by applying the aggregated machine learning model to customize an electronically displayed security alert report. Various other methods, systems, and computer-readable media are also disclosed.

20 Claims, 6 Drawing Sheets

SYSTEMS AND METHODS FOR CUSTOMIZING SECURITY ALERT REPORTS

BACKGROUND

One frequent problem that arises in alert systems that handle sensitive data is that customers of the alert systems either will not, or cannot, share data about the performance of the alert systems. In some examples, the customers may be prevented from sharing confidential information due to legal restrictions. Nevertheless, the data about the performance of the alert systems may be highly useful to the vendors and developers of the alert systems. For example, the performance data may include information identifying false positives.

Because of the restrictions outlined above, modern vendors and developers of alert systems may develop these systems internally and then ship them out into the world, but without performing much tuning or customization for specific customers. In some cases, the vendors and developers may encourage customers to tune these systems themselves, but this approach has its own drawbacks. Consequently, modern alert systems often generate far too many, or too few, security alerts, thereby indicating that the prioritization of the security alerts has been poorly calibrated.

One major factor contributing to this challenge is the diversity of the customer base. For data loss prevention products, for example, online sellers and banks that have large amounts of customer credit card and other financial data typically wish to safeguard this data as a top priority. In contrast, healthcare providers may prioritize protecting medical record data. Similarly, customers of an advanced threat protection product also have different priority schemes. Additionally, various customers in the customer base also differ in terms of how much capacity they have to respond to security alerts, because some are lightly staffed and overburdened, whereas others have larger staffs and can handle a greater capacity of security alerts.

To address the needs of such a broad customer base, it is helpful that the alert system is tuned, adapted, or customized to each specific customer. At the same time, it will be beneficial to achieve this customization without requesting that the customer reveal confidential data that the customer may be unwilling or unable to share. In this scenario, the goal is to enable customers to benefit from the wisdom of their peers while simultaneously protecting confidential information. The instant disclosure, therefore, identifies and addresses a need for systems and methods for customizing security alert reports.

SUMMARY

As will be described in greater detail below, the instant disclosure describes various systems and methods for customizing security alert reports. In one example, a computer-implemented method for customizing security alert reports may include (i) identifying a local machine learning model that predicts how a client responds to security alerts generated for the client, (ii) identifying a set of peer machine learning models that predict how a set of peers of the client each responds to security alerts generated for each respective peer, (iii) measuring a level of similarity between the client and each respective peer of the set of peers according to a similarity metric to create a similarity model, (iv) aggregating the local machine learning model and at least one of the set of peer machine learning models based on the similarity model to create an aggregated machine learning model, and (v) protecting the client by applying the aggregated machine learning model to customize an electronically displayed security alert report generated for the client.

In one embodiment, the local machine learning model is trained using training data that may include: data describing security alerts generated for the client and data describing how the client responded to the security alerts generated for the client. In one embodiment, the data describing how the client responded to the security alerts generated for the client may include (i) data designating a response action performed in response to each respective security alert, (ii) data describing an amount of time taken by the client to perform the response action, and/or (iii) data describing feedback that the client provided to a security analyst.

In one embodiment, the data describing feedback that the client provided to the security analyst may include data indicating a level of severity for a corresponding security alert and/or data indicating whether the corresponding security alert was a false positive. In one embodiment, the local machine learning model predicts how the client responds to security alerts generated for the client by ranking security alerts such that a higher ranking of a specific security alert indicates a higher likelihood that the client will respond to the specific security alert.

In one embodiment, the local machine learning model excludes any information that has been categorized as sensitive for the client. In one embodiment, the information that has been categorized as sensitive for the client includes personally identifiable information.

In one embodiment, the local machine learning model may include (i) a generalized additive machine learning model, (ii) a naïve Bayes machine learning model, and/or (iii) a linear regression machine learning model. In one embodiment, the method may further include performing a security action to protect the client in response to the electronically displayed security alert report customized by the aggregated machine learning model.

In one embodiment, the similarity metric measures the level of similarity between the client and each respective peer of the set of peers along at least one of these dimensions: (i) information indicating a sector in which the client operates, (ii) public information extracted from the Internet that describes the client, (iii) a response rate of the client, and/or (iv) an indication of whether the client is underwhelmed or overwhelmed by security alerts. In one embodiment, a level of influence, within the aggregated machine learning model, of each one of the set of peer machine learning models aggregated with the local machine learning model is proportional to the measured level of similarity between the client and a respective peer.

In some examples, aggregating the local machine learning model may include aggregating the local machine learning model with a defined number of the set of peer machine learning models that are ranked highest in terms of similarity between the client and each respective peer according to the similarity model. In one embodiment, the local machine learning model and the at least one of the set of peer machine learning models vote, within the aggregated machine learning model, on whether to highlight a security alert to the client.

In one embodiment, the aggregated machine learning model enables the client to benefit from wisdom of the set of peers of the client. In one embodiment, the aggregated machine learning model enables the client to benefit from the wisdom of the set of peers of the client without exposing data that has been categorized as confidential.

In one embodiment, a system for implementing the above-described method may include (i) an identification module, stored in memory, that (a) identifies a local machine learning model that predicts how a client responds to security alerts generated for the client and (b) identifies a set of peer machine learning models that predict how a set of peers of the client each responds to security alerts generated for each respective peer, (ii) a measurement module, stored in memory, that measures a level of similarity between the client and each respective peer of the set of peers according to a similarity metric to create a similarity model, (iii) an aggregation module, stored in memory, that aggregates the local machine learning model and at least one of the set of peer machine learning models based on the similarity model to create an aggregated machine learning model, (iv) a protection module, stored in memory, that protects the client by applying the aggregated machine learning model to customize an electronically displayed security alert report generated for the client, and (v) at least one physical processor configured to execute the identification module, the measurement module, the aggregation module, and the protection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a local machine learning model that predicts how a client responds to security alerts generated for the client, (ii) identify a set of peer machine learning models that predict how a set of peers of the client each responds to security alerts generated for each respective peer, (iii) measure a level of similarity between the client and each respective peer of the set of peers according to a similarity metric to create a similarity model, (iv) aggregate the local machine learning model and at least one of the set of peer machine learning models based on the similarity model to create an aggregated machine learning model, and (v) protect the client by applying the aggregated machine learning model to customize an electronically displayed security alert report generated for the client.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
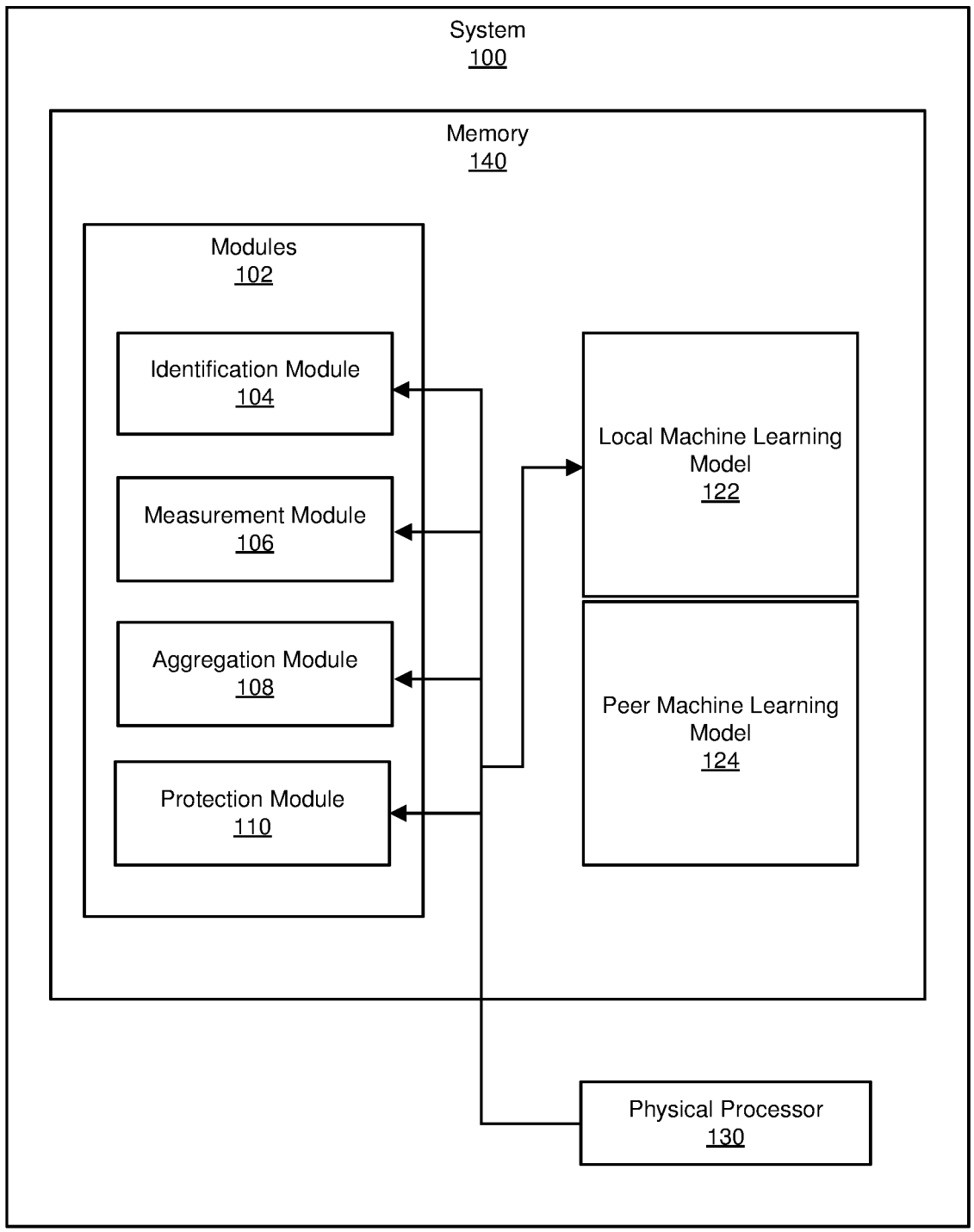
FIG. 1 is a block diagram of an example system for customizing security alert reports.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for customizing security alert reports. As discussed further below, the disclosed subject matter may improve upon related systems by enabling these systems to customize security alert reports for one or more customers. For example, the disclosed subject matter may enable the vendor or developer of an alert system to customize a security alert report based on the customer's level of sensitivity regarding certain types of information (e.g., how sensitive the customer is to releasing medical information, educational information, financial information, etc.). The disclosed subject matter may also enable the vendor or developer to customize the security alert report based on how much capacity the vendor has for addressing security alerts. Moreover, the disclosed subject matter may also achieve one or more of these benefits without compromising confidential information of the client, as discussed further below.

Figure 2:
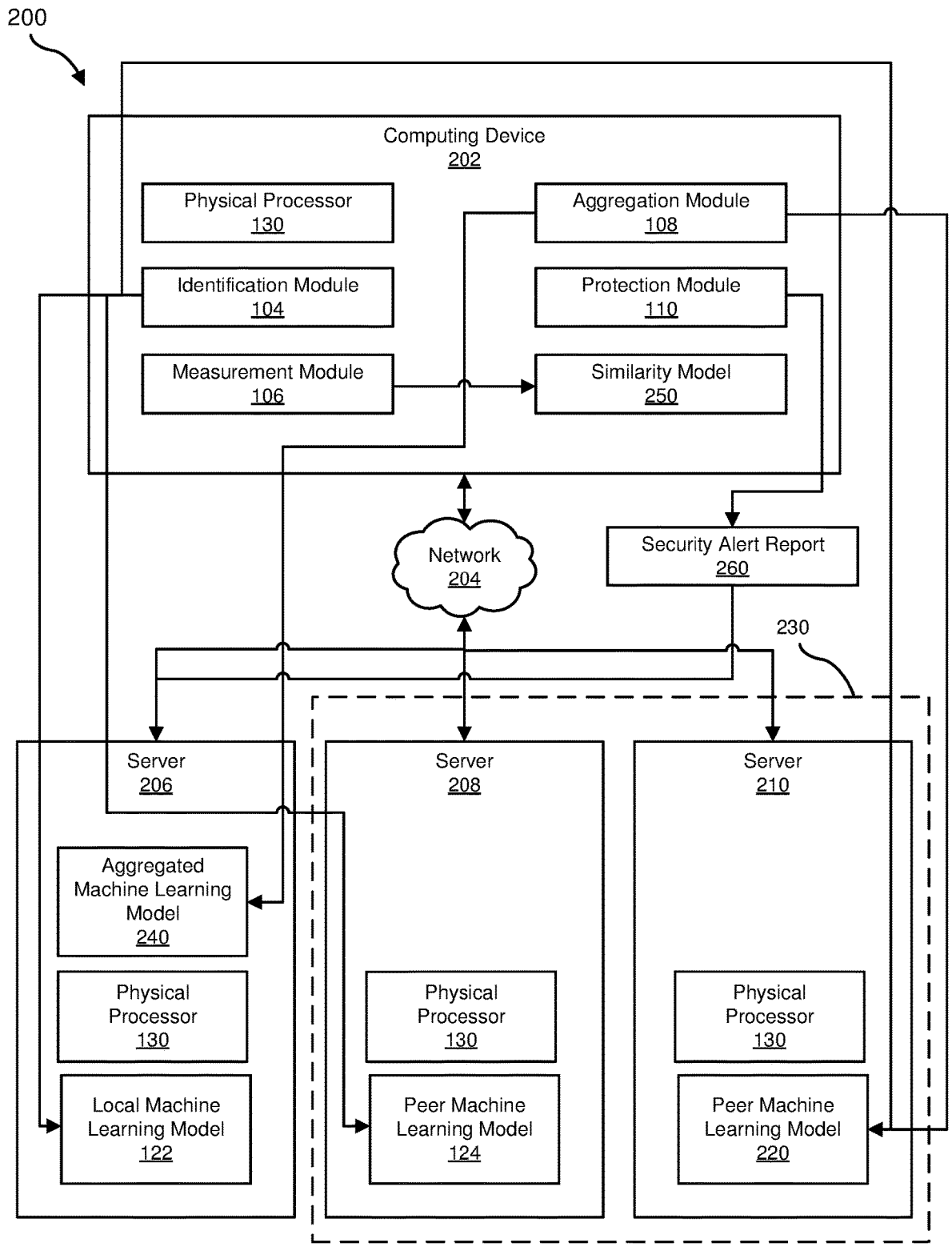
FIG. 2 is a block diagram of an additional example system for customizing security alert reports.

The following will provide, with reference to FIGS. 1-2, detailed descriptions of example systems for customizing security alert reports. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for customizing security alert reports. As illustrated in this figure, example system 100 may include one or more modules 102 for performing one or more tasks. For example, and as will be explained in greater detail below, example system 100 may include an identification module 104 that identifies a local machine learning model, such as a local machine learning model 122, that predicts how a client responds to security alerts generated for the client. Identification module 104 may also identify a set of peer machine learning models, including for example a peer machine learning model 124, that predict how a set of peers of the client each responds to security alerts generated for each respective peer. Example system 100 may additionally include a measurement module 106 that measures a level of similarity between the client and each respective peer of the set of peers according to a similarity metric to create a similarity model. Example system 100 may also include an aggregation module 108 that aggregates the local machine learning model and at least one of the set of peer machine learning models based on the similarity model to create an aggregated machine learning model. Example system 100 may additionally include a protection module 110 that protects the client by applying the aggregated machine learning model to customize an electronically displayed security alert report generated for the client. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate customizing security alert reports. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to customize security alert reports.

For example, and as will be described in greater detail below, identification module 104 may identify local machine learning model 122 that predicts how a client, which may maintain server 206, responds to security alerts generated for the client. Identification module 104 may identify a set 230 of peer machine learning models, including for example peer machine learning model 124 and a peer machine learning model 220, that predict how a set of peers of the client each responds to security alerts generated for each respective peer. In this illustrative example, one peer of the client may maintain a server 208 and another peer of the client may maintain a separate server 210. Measurement module 106 may measure a level of similarity between the client (e.g., a customer that maintains server 206) and each respective peer of the set of peers (e.g., the two separate customers who maintain server 208 and server 210, respectively) according to a similarity metric to create a similarity model 250. Aggregation module 108 may aggregate local machine learning model 122 and at least one of the set of peer machine learning models, such as peer machine learning model 124 and/or peer machine learning model 220, based on similarity model 250 to create an aggregated machine learning model 240. Protection module 110 may protect the client by applying aggregated machine learning model 240 to customize an electronically displayed security alert report 260 generated for the client.

Computing device 202 generally represents any type or form of computing device capable of reading computer-executable instructions. In some illustrative examples, computing device 202 corresponds to a backend security server, workstation, and/or general-purpose computer that a vendor and/or developer of a security alert system maintains to perform at least part of method 300, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of generating a machine learning model, applying a machine learning model to customize a security alert report, receiving a security alert report, and/or displaying security alert reports, in accordance with method 300 and/or FIG. 2, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. Moreover, in some examples, a configuration of server 206 may parallel a configuration of server 208 and/or server 210 partially or entirely.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
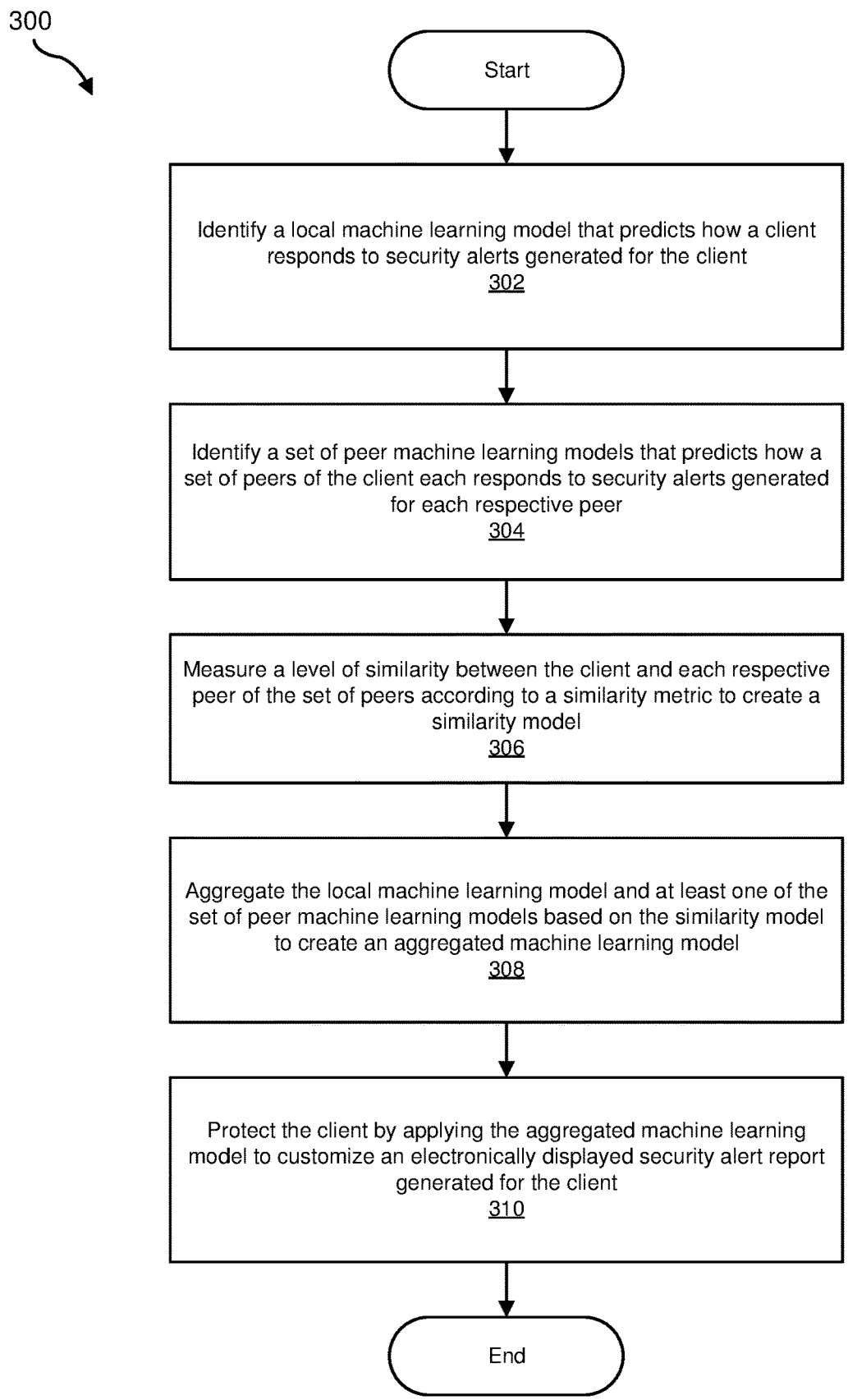
FIG. 3 is a flow diagram of an example method for customizing security alert reports.

FIG. 3 is a flow diagram of an example computer-implemented method 300 for customizing security alert reports. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a local machine learning model that predicts how a client responds to security alerts generated for the client. For example, identification module 104 may, as part of computing device 202 in FIG. 2, identify local machine learning model 122 that predicts how the client maintaining server 206 responds to security alerts generated for the client.

As used herein, the term "client" generally refers to any entity that receives security alert reports and/or responds to security alert reports, in accordance with method 300. Illustrative examples of such clients may include enterprise organizations, corporations, and/or customers, such as customers of a security alert vendor or developer. More generally, the term "client" refers to an entity for which a security alert report is prepared, as discussed further below. In other words, each client may constitute a candidate target of a security attack or threat, which may be potentially averted, thwarted, or ameliorated by the security alert report. Additionally or alternatively, as used herein, the term "client" may also refer to one or more computing systems, such as server 206, that is maintained or operated by such an organization, corporation, and/or customer, or an employee or member of one of these, as further outlined above.

Additionally, as used herein, the term "local machine learning model" simply refers to a machine learning model that is local to, or specific to, the client of step 302. In some examples, the local machine learning model may be generated, transmitted from (or transmitted to), tuned, and/or applied at a location that is remote from the client, even though the local machine learning model is still "local" to the client in the sense that it is customized to the client. For example, the local machine learning model may be generated, transmitted from, transmitted to, tuned, and/or applied at computing device 202, which may correspond to a back-end server of a security vendor such as SYMANTEC, as further discussed above.

Moreover, as used herein, the term "machine learning model" generally refers to an output model, formula, data structure, and/or tuned algorithm that was output, or generated, by a machine learning algorithm, protocol, system, or formula. The machine learning model may be formatted or configured to accept items of input and then transform these items of input into items of output, such as by labeling the items of input. In some specific examples, the various machine learning models of method 300 may accept identifiers or descriptors of security alerts as inputs and, in response, vote, score, and/or label the security alerts, thereby predicting how a corresponding client or peer will respond to the security alert, as discussed further below.

Identification module 104 may identify the local machine learning model in a variety of ways. In some examples, identification module 104 may identify the local machine learning model by generating the local machine learning model. In other examples, identification module 104 may identify the local machine learning model by requesting and/or receiving the local machine learning model. For example, identification module 104 may request the local machine learning model from the client at server 206, which may respond to the request by providing a copy of the local machine learning model. In these examples, the client at server 206 may itself have generated the local machine learning model.

In one embodiment, the local machine learning model is trained using training data that may include data describing security alerts generated for the client. This data may include original data and/or metadata describing a name, description, identifier, attack vector, hash or fingerprint, origin, trigger, cause, timing, signature, and/or repair option for the security alert.

Additionally or alternatively, the local machine learning model is trained using training data that includes data describing how the client responded to the security alerts generated for the client. For example, the data describing how the client responded to the security alerts generated for the client may include data designating a response action performed in response to each respective security alert. The response action performed in response to each respective security alert may include either ignoring the security alert or performing a positive remedial action step in response to the security alert, which is discussed further below in connection with step 310.

Additionally or alternatively, the data describing how the client responded to the security alerts generated for the client may include data describing an amount of time taken by the client to perform the response action. For example, in some scenarios the client may take longer to respond to a security alert than the amount of time that the client took to respond to a different security alert. In these examples, a higher response time may potentially indicate a higher level of priority for that respective security alert according to the client's customized priority scheme.

Moreover, additionally or alternatively, data describing how the client responded to the security alerts generated for the client may also include data describing feedback that the client provided to a security analyst. For example, data describing feedback that the client provided to the security analyst may include data indicating a level of severity for a corresponding security threat. In some examples, the feedback may indicate that the corresponding security threat had low severity or high severity. In further examples, the feedback may indicate a correction such that the client indicates a higher, or lower, level of severity than the original indication of the security alert provided to the client. Additionally or alternatively, data describing feedback that the client provided to the security analyst may also include data indicating whether the corresponding security threat was a false positive or true positive. Similarly, the client may provide feedback indicating that a failure to report a security alert indicates a false negative or a true negative.

In some examples, the local machine learning model may include a machine learning model formatted, or generated, according to one or more of the following protocols, algorithms, or categories: (i) a generalized additive machine learning model, (ii) a naïve Bayes machine learning model, and/or (iii) a linear regression machine learning model. In some examples, these machine learning protocols may be beneficial because they are immune, or more immune, to membership inference attacks than other machine learning protocols. Additionally or alternatively, one or more of these machine learning protocols may be beneficial due to enabling a corresponding machine learning model to omit sensitive, classified, and/or personally identifiable information. For example, one or more of these machine learning protocols may be more suitable for method 300 then a support vector machine's machine learning protocol and/or a deep neural network's machine learning protocol, although one or more of these may also be used for the local machine learning model of step 302.

In one embodiment, the local machine learning model predicts how the client responds to security alerts generated for the client by ranking security alerts such that a higher ranking of a specific security alert indicates a higher likelihood that the client will respond to the specific security alert. Additionally or alternatively, the local machine learning model may simply generate a score along an axis in order to measure how likely the client is predicted to be in responding to a specific security alert. Accordingly, after ranking the security alerts a threshold number of security alerts may be applied to cut off lower ranking security alerts. Similarly, after scoring the security alerts, a threshold score may be applied to cut off lower scoring security alerts, as discussed further below more in connection with step 310 of method 300.

In one embodiment, the local machine learning model excludes any information that has been categorized as sensitive for the client. In some examples, the client may categorize information as sensitive for any reason, including categorizing information as sensitive due to the information being confidential, legally required to be kept confidential, and/or indicating personally identifiable information of one or more human users, clients, customers, enterprise organizations, and/or corporations, etc. In some examples, the information that has been categorized as sensitive may include information indicating which specific security alerts previously triggered at the corresponding client and/or peer, because (for example) this information may potentially reveal one or more of the items of sensitive or confidential information listed above (e.g., through a membership inference attack or other analysis of the security alert data).

At step 304, one or more of the systems described herein may identify a set of peer machine learning models that predict how a set of peers of the client each responds to security alerts generated for each respective peer. For example, identification module 104 may, as part of computing device 202 in FIG. 2, identify set 230 of peer machine learning models, including for example peer machine learning model 124 and/or peer machine learning model 220, that predict how the set of peers of the client each responds to security alerts generated for each respective peer.

As used herein, the term "peer" generally refers to any entity that may be a candidate target of a security attack and/or benefit from a security alert report to potentially avert, thwart, and/or ameliorate such an attack, in parallel with the client of step 302. In illustrative examples, both the client of step 302 and one or more of the peers of step 304 are clients or customers of a security vendor, such as a security vendor or developer that provides security alert reports, as further discussed above. In other words, one or more of the "peers" of step 304 may be similarly situated to the client of step 302, along one or more dimensions, such that the client may benefit from the wisdom of these peers due to their similar situation or circumstances. In general, a type, category, situation, formatting, or configuration of the client of step 302 may apply, in parallel, to one or more of the peers of step 304 (e.g., they are both customers of the same vendor, they are both client machines operating software provided by the same vendor, etc.). Moreover, as used herein, the term "set of peers" generally refers to one or more peers. Similarly, as used herein, the term "set of peer machine learning models" generally refers to one or more of these models. In general, the "set of peers" may optionally be mapped to the "set of peer machine learning models" in a respective one-to-one relationship.

Identification module 104 may identify the set of peer machine learning models in a variety of ways. In general, identification module 104 may perform step 304 in a manner that parallels the performance of step 302. Accordingly, each of the sets of pure machine learning models may parallel the local machine learning model in formatting, structure, protocol, etc. Similarly, each of the peers of step 304 may parallel the client of step 302, as further discussed above. One difference is that the local machine learning model of step 302 is configured to predict how the client will respond to security alerts, whereas the various models of the set of peer machine learning models are configured to predict how each respective peer will respond to security alerts. For example, as with step 302 described above, each of the peers of step 304 may generate a peer machine learning model on premise and/or computing device 202 of a security vendor may generate the respective peer machine learning model. Additionally, identification module 104 may optionally identify the set of peer machine learning models by receiving input, such as manual input or inter-application input, designating which peers and/or which respective peer machine learning models will be included within set 230 of peer machine learning models.

At step 306, one or more of the systems described herein may measure a level of similarity between the client and each respective peer of the set of peers according to a similarity metric to create a similarity model. For example, measurement module 106 may, as part of computing device 202 in FIG. 2, measure a level of similarity between the client and each respective peer of the set of peers according to a similarity metric to create similarity model 250.

As used herein, the term "level of similarity" generally refers to any measurement, such as a numerical measurement, of similarity between two items. For example, the level of similarity may indicate how similar the client is to one or more peers of the set of peers along one or more dimensions, including how similar these two items or individuals are when prioritizing different security alerts. Similarly, the term "similarity metric" generally refers to any metric, protocol, scheme, and/or algorithm for comparing two items and/or computing a level of similarity, such as a level of similarity along a numerical axis. Furthermore, as used herein, the term "similarity model" generally refers to any model or output resulting from the measurement of step 306 and indicating a level of similarity between the client and one or more (e.g., one, some, or all) peers, as discussed further below.

Measurement module 106 may measure the level of similarity between the client and one or more of the peers within the set of peers in a variety of ways. In general, measurement module 106 may identify a numerical measurement of one attribute of the client (e.g., a measured level of responsiveness of the client to a particular security alert), identify a numerical measurement of the same attribute of one or more of the peers (e.g., a measured level of responsiveness of the peer to the same security alert), compare these two items of information numerically or otherwise, and generate a measured level of similarity that indicates how similar or near these two measurements are to each other (e.g., how similar they are to each other along the same axis of similarity, such as a 10 point axis from 0 to 10).

In one embodiment, the similarity metric measures the level of similarity between the client and each respective peer of the set of peers along at least one of the following dimensions. For example, the similarity metric may measure the level of similarity between the client and each respective peer of the set of peers along a dimension indicating a sector in which the client operates. For example, a client that works in the financial sector would be more similar to a peer that works in the financial sector than the client would be in comparison to a different peer that works in the education sector rather than the financial sector.

Additionally or alternatively, the similarity metric may measure the level of similarity between the client and each respective peer of the set of peers along a dimension based on public information extracted from the Internet that describes the client. For example, measurement module 106 may extract public information about the client from a public resource, such as a WIKIPEDIA article. Additionally, measurement module 106 may optionally extract public information about a respective peer from another public resource, such as a WIKIPEDIA article for the peer. These public sources of information may further indicate more granular items of information, such as a name, sector, age, origin, location, history, address, product space, etc. Accordingly, measurement module 106 may compare the client and each respective peer of the set of peers along any one or more of the above identified dimensions, using information extracted from a public source, such as the Internet.

Additionally or alternatively, the similarity metric may measure the level of similarity between the client and each respective peer of the set of peers along a dimension indicating a response rate of the client/peer. For example, a client with a high rate of response to security alerts would have a higher measured level of similarity with a peer who also has a high rate of response to security alerts, in comparison to a different peer who has a low rate of response to security alerts. Furthermore, the similarity metric may also optionally measure the level of similarity between the client and each respective peer of the set of peers along a dimension indicating whether the client/peer is underwhelmed or overwhelmed by security alerts. In other words, clients who indicate that they are overwhelmed by security alerts will be measured by measurement module 106 as more similar to peers that indicate the same, in comparison to other peers who indicate that they are underwhelmed by security alerts. In general, measurement module 106 may use any one or more of the above identified attributes and/or dimensions, according to any permutation, as factors within a similarity calculus to arrive at a measured level of similarity between the client and each respective peer of the set of peers.

Figure 4:
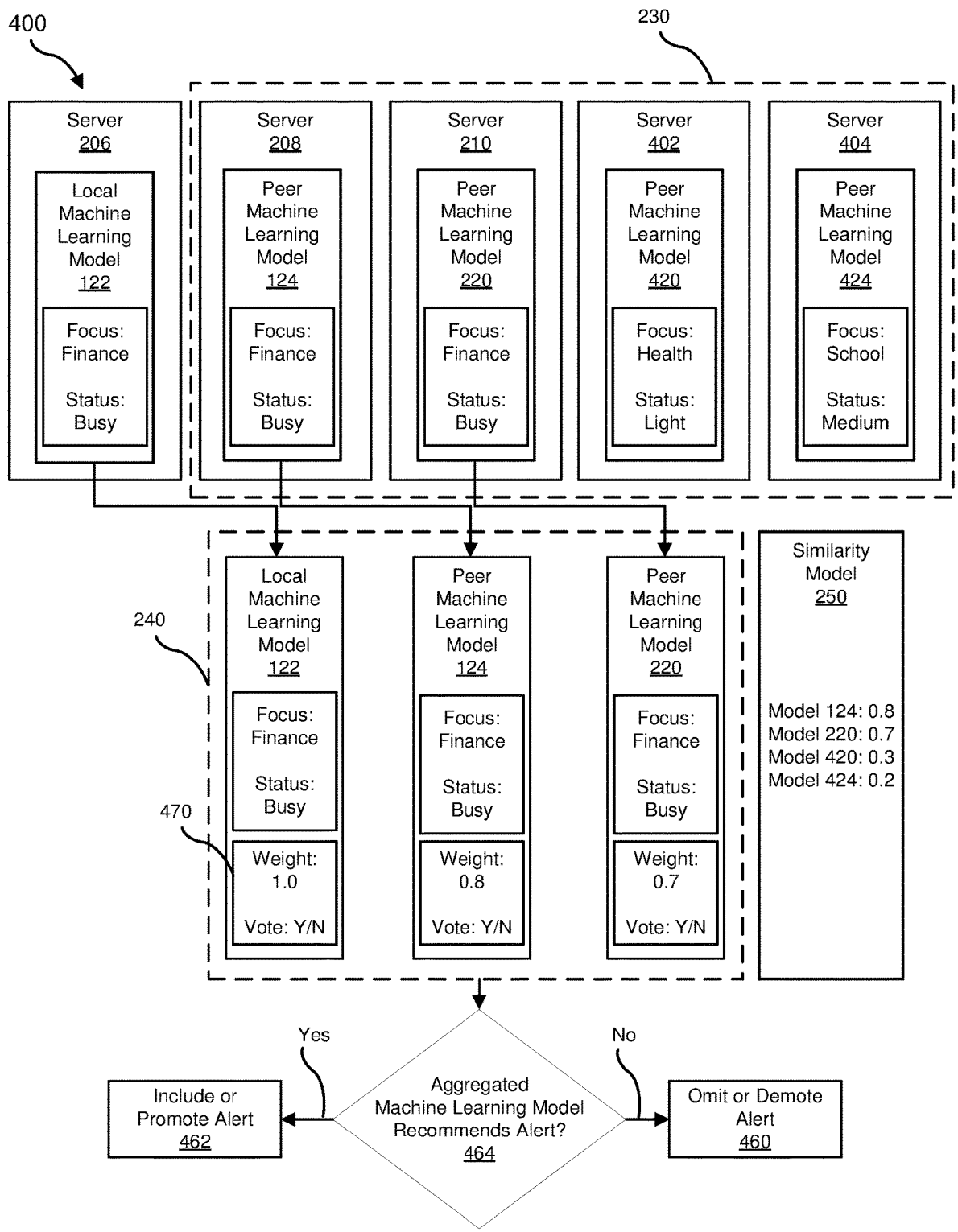
FIG. 4 is a workflow diagram of an example workflow illustrating an example method for customizing security alert reports.

FIG. 4 shows an example workflow diagram 400 that further illustrates a workflow corresponding to the performance of method 300, as discussed further below. In this illustrative example, the client of step 302 may operate server 206, as further discussed above. Additionally, server 208 and server 210 from FIG. 2 are now supplemented with two additional servers, a server 402 and a server 404. Each one of the servers may correspond to a peer within the set of peers, which further corresponds to the set 230 of peer machine learning models. As further shown in FIG. 4, each one of server 206, server 208, server 210, server 402, and server 404 may correspond to a respective machine learning model, in this case local machine learning model 122, peer machine learning model 124, peer machine learning model 220, a peer machine learning model 420, and a peer machine learning model 424.

Moreover, each of the machine learning models listed above may indicate, directly or indirectly, one or more attributes of the respective client or peer. For example, FIG. 4 illustrates how, within local machine learning model 122, there is an indication that the client has a focus, or prioritization, on finance. Similarly, this figure also illustrates how, within local machine learning model 122, there is an indication that the client is relatively busy, and therefore less likely to respond to an arbitrary security alert. These two attributes are merely illustrative, and a respective machine learning model may indicate, directly or indirectly, an arbitrary number of attributes for the respective client or peer. Additionally, FIG. 4 merely lists these attributes in terms of a symbol or category, such as "finance" or "busy," but in other examples, the attributes may be measured along a vector having two or more dimensions, which indicate not just a direction (e.g., "finance") but also a numerical measurement of weight along the dimension or axis of measurement (e.g., a measurement along a ten point scale indicating how much priority the respective client or peer gives to "finance"). In fact, in some optional examples, due to the nature of certain machine learning algorithms or protocols, each respective machine learning model may indicate, or encode, attributes of the respective client or peer that are not readily parsable or understandable by a human observer. Moreover, the remaining peer machine learning models shown in FIG. 4 indicate parallel values for the same fields (e.g., "focus" and "status" shown in FIG. 4) for respective peers of the client.

At step 308, one or more of the systems described herein may aggregate the local machine learning model and at least one of the set of peer machine learning models based on the similarity model to create an aggregated machine learning model. For example, aggregation module 108 may, as part of computing device 202 in FIG. 2, aggregate local machine learning model 122 and at least one of set 230 of peer machine learning models based on similarity model 250 to create aggregated machine learning model 240.

As used herein, the term "aggregated machine learning model" generally refers to any model or data structure that is based on the local machine learning model and at least one of the peer machine learning models. In general, the aggregated machine learning model may accept items of input, and/or generate items of output, that parallel the same items of input/output accepted by the underlying machine learning models. More specifically, the aggregated machine learning model may accept identifiers of security alerts as inputs and may generate output by voting on, scoring, or otherwise labeling, the security alerts, as further discussed above. In some illustrative examples, the aggregated machine learning model may simply generate a weighted score that averages, aggregates, and/or combines the underlying scores generated by the local machine learning model and the one or more peer machine learning models in proportion to the respective level of similarity measured at step 306, as is also further discussed above.

Aggregation module 108 may aggregate the local machine learning model and at least one of the peer machine learning models in a variety of ways. In one example, aggregation module 108 may perform step 308 at least in part by aggregating the local machine learning model with a defined number of the set of peer machine learning models that are ranked highest in terms of similarity between the client and each respective peer according to the similarity model. Returning to FIG. 4, aggregated machine learning model 240 has been generated by aggregation module 108 at step 308. In this example, aggregated machine learning model 240 has been generated based on the underlying combination of local machine learning model 122, peer machine learning model 124, and peer machine learning model 220. Accordingly, the influence or input of peer machine learning model 420 and peer machine learning model 424 has been excluded from aggregated machine learning model 240.

Moreover, as first discussed above, peer machine learning model 420 and peer machine learning model 424 may have been excluded, or cut off, from aggregated machine learning model 240 because the respective peers were not sufficiently similar, according to similarity model 250, to the client of step 302. For example, aggregation module 108 may optionally only include the top-ranking peer machine learning models (in terms of an absolute or percentage rank). In this particular example, aggregation module 108 may apply a threshold of the top two peers, according to similarity model 250, which would include the respective peer machine learning models for server 208 and server 210 while excluding the respective peer machine learning models for server 402 and server 404. The same result would occur if aggregation module 108 applied the threshold of the top 50% of the peers according to similarity model 250.

Additionally or alternatively, aggregation module 108 may apply a numerical threshold of a similarity score to establish the cutoff. In the example of FIG. 4, aggregation module 108 could apply a threshold of 0.6 to similarity model 250, in which case aggregation module 108 would include the respective peer machine learning model for server 208 and server 210 within aggregated machine learning model 240, while excluding the respective peer machine learning models for server 402 and server 404, as further shown in this figure.

Additionally or alternatively, in some examples a level of influence, within the aggregated machine learning model, of each one of the set of peer machine learning models aggregated with the local machine learning model is proportional to the measured level of similarity between the client and a respective peer. In the example of FIG. 4, each of the respective machine learning models that underlie aggregated machine learning model 240 (i.e., local machine learning model 122, peer machine learning model 124, and peer machine learning model 220) has been tagged, labeled, and/or supplemented with another item 470 of metadata. Item 470 of metadata may optionally indicate a weight of the respective underlying machine learning model. Additionally or alternatively, item 470 of metadata may optionally indicate a vote of that respective machine learning model, as further illustrated in FIG. 4.

In the example of FIG. 4, aggregation module 108 has assigned a specific numerical weight to each of the respective machine learning models that underlie aggregated machine learning model 240. In this specific example, the weight of each peer machine learning model is identical to the level of similarity measured by measurement module 106 at step 306, and further shown within similarity model 250 within FIG. 4. In other words, the level of similarity measured for peer machine learning model 124 is 0.8, which is the same weight assigned to peer machine learning model 124 within item 470 of metadata. In parallel, the level of similarity measured for peer machine learning model 220 is 0.7, which is the same weight assigned to peer machine learning model 220 within item 470 of metadata, as further shown in FIG. 4. In these examples, the level of weight is identical to the level of similarity, but in other examples these values may be merely proportional to each other, or the level of weight may be based on the level of similarity without being identical to it.

Additionally or alternatively, in one embodiment, the local machine learning model and the at least one of the set of peer machine learning models vote, within the aggregated machine learning model, on whether to highlight a security alert to the client. As used herein, the phrase "highlight the security alert" generally refers to either including the security alert within a corresponding security alert report and/or raising a score, level of visibility, and/or level of conspicuousness for that security alert. As further shown in FIG. 4, item 470 of metadata may also optionally include a vote for each respective machine learning model that underlies aggregated machine learning model 240. As one specific example for illustration purposes, local machine learning model 122 could vote "yes" on a specific security alert, peer machine learning model 124 could vote "no," and peer machine learning model 220 could vote "no." In this specific example, aggregated machine learning model 240 would overall vote "no" on the specific security alert, because the majority of the underlying votes are "no." Accordingly, workflow diagram 400 would proceed to step 460, from a corresponding decision step 464, at which point aggregation module 108 and/or protection module 110 would omit or demote the specific security alert when preparing the customize security alert report in accordance with step 310. Alternatively, if the majority vote had been "yes," then workflow diagram 400 would proceed to step 462, at which point aggregation module 108 and/or protection module 110 will include or promote the specific security alert in a parallel manner, and as discussed further below.

Of course, in the examples described above the vote of each underlying machine learning model may also be weighted in proportion to the weight listed within item 470 of metadata, as further discussed above. And, in the case of a weighted vote, the final tally of votes may be compared with a numerical threshold to determine whether the overall vote of aggregated machine learning model 240 indicates a "yes" or "no." Additionally, even in the case in which aggregated machine learning model 240 did not issue a vote on a specific security alert, aggregated machine learning model 240 may nevertheless measure, rank, score, and/or label the specific security alert, such as by numerically scoring the security alert in a manner that predicts how likely the client is to respond to the security alert, or otherwise indicates a measurement of importance to the client of the security alert.

At step 310, one or more of the systems described herein may protect the client by applying the aggregated machine learning model to customize an electronically displayed security alert report generated for the client. For example, protection module 110 may, as part of computing device 202 in FIG. 2, protect the client by applying aggregated machine learning model 240 to customize security alert report 260, which may optionally be displayed electronically to the client, and which was optionally generated for the client by a security vendor, such as a security vendor operating computing device 202, for example.

As used herein, the term "security alert report" generally refers to any report that identifies security alerts that were triggered at a security system that monitors for security threats or attacks on a corresponding client or peer, as further discussed above. In some examples, a security analyst may assist in preparing the security alert report, such as by editing, revising, proofing, curating, commenting on, and/or supplementing the security alert report. Furthermore, in some examples, the security alert report may indicate whether a cluster of security alerts correspond to a security incident, such as a network intrusion and/or a malware attack. Similarly, in further examples, the security alert report may optionally indicate that a security alert triggered but was categorized as not part of a security incident, or otherwise categorized as a false positive. Moreover, the security alert report may optionally include descriptive material, or other metadata, that further describe the underlying security alerts to help the reader of the security alert report understand the nature of the security alerts, such as by indicating a name, origin, timing, location, and/or attack vector associated with the security alert. These items of metadata may include any permutation of the items of metadata for security alerts listed above regarding step 302.

Furthermore, in some examples the security alert report may also optionally recommend one or more remedial actions that the client may perform in response to protect itself from a security threat indicated by one or more of the security alerts identified by the security alert report. In response, the client, the client's computing system such as server 206, and/or an endpoint security program at the client's computing system (e.g., in coordination with computing device 202 and/or in accordance with method 300) may optionally perform the remedial action. Examples of the remedial action or security action may include applying or executing a security patch, inoculation patch, and/or protective program, especially one that is specifically tailored, customized, and/or targeted to one or more of the security alerts identified by aggregated machine learning model 240 and/or the customized security alert report. Additionally or alternatively, the remedial action or security action may include powering down, turning off, quarantining, sandboxing, inoculating, isolating, throttling, and/or inhibiting one or more computing resources, such as a hardware, software, network, virtual, and/or firmware computing resource. Additionally or alternatively, the remedial action may include issuing an additional, or more conspicuous, warning to a user or administrator, including a warning transmitted by text message, email, smart phone, pop-up, audio output, and/or forum message, etc. Additionally or alternatively, the remedial action may include enabling, heightening, turning on, and/or toggling one or more security settings, security features, security protocols, and/or security mechanisms.

Protection module 110 may protect the user by customizing the security alert report in a variety of ways. In general, protection module 110 may protect the user by applying the aggregated machine learning model that was generated at step 308, as discussed above. Applying the aggregated machine learning model, rather than simply applying the local machine learning model, may enable the client to benefit from the "wisdom" of the set of peers corresponding to set 230 of peer machine learning models. Moreover, in some examples, the aggregated machine learning model enables the client to benefit from the wisdom of the set of peers of the client without exposing data that has been categorized as confidential, as further discussed above.

In one specific example, protection module 110 may protect the user by customizing the security alert report to include a security alert based on the application of the aggregated machine learning model. In some examples, the specific security alert may not otherwise have been included within the security alert report, except for the application of the aggregated machine learning model. For example, the peer machine learning models aggregated with the local machine learning model may indicate that the peers of the client were likely to respond to the specific security alert, and therefore the aggregated machine learning model may further indicate that the client would and/or should respond to the security alert. Accordingly, protection module 110 may protect the user by customizing the security alert report in a manner that inserts the specific security alert that would not otherwise have been included within the security alert report. In other words, protection module 110 may apply the aggregated machine learning model to a candidate security alert report such that the aggregated machine learning model either inserts one or more security alerts that would not otherwise have been included within the security alert report and/or filters one or more security alerts that were already included within the candidate security alert report. In this manner, the client may benefit from the wisdom of the peers, within the set of peers, by receiving a security alert, within the security alert report, that the client would not have otherwise received.

The above discussion provides a general overview of method 300 shown in FIG. 3. Additionally or alternatively, the following discussion provides a supplemental overview of further concrete and detailed embodiments of the disclosed subject matter. In general, any one or more of the steps or features described below may be performed by any suitable one or more of modules 102, in accordance with method 300.

Rather than collect data (e.g., sensitive data, such as security alert data) from customers, the disclosed subject matter may instead collect machine learning models. Additionally, the disclosed subject matter may combine these machine learning models with one or more customer descriptions to identify a context of customers with similar needs, and thereby achieve personalized prioritization models. In performing this customization, the disclosed subject matter may also prevent the overfitting of the machine learning models for poor customer habits (e.g., poor customer habits of one customer may be outweighed by the wisdom of the peers of the customer within the aggregated machine learning model, as discussed further below). One or more of these features may be achieved by collecting individualized prioritization models, which are optionally combined in a weighted ensemble so that customers benefit from a global model (e.g., aggregated machine learning model 240). Additionally, in preparing the weighted ensemble, customers need not share personal data and/or data indicating which specifics security alerts triggered on the customers' client-side machines.

For each customer, the disclosed subject matter may treat the existing alert system as a black box. Accordingly, the disclosed subject matter may train a local, privacy-preserving model that learns how the customer responds to the security alerts provided by a security alert product. These local or individualized models are collected by the disclosed subject matter (e.g., by identification module 104), along with features that describe each customer (e.g., identification module 104 may further collect information, such as the WIKIPEDIA article information and other information discussed above, used in performance of step 306 of method 300). The disclosed subject matter (e.g., aggregation module 108) may then use these items of information to train a weighted ensemble of machine learning models, which may optionally be shipped back to the customer to be applied on one or more local machines of the customer.

A discussion follows of training local prioritization models. On-premise model training takes one or more of the following items of data as input: (i) information about each alert, optionally with all attendant metadata, and (ii) available information about the customer's responses to such alerts. In some examples, on-premise training of the local machine learning models may take as inputs some or all of these items of information that are available to the security vendor managing computing device 202. The response data for an alert could include any actions that were taken by the customer in response, how much time (if any) was spent by the customer responding to the alert, feedback from the customer about the analyst's opinion or categorization of the alert (e.g., such as its severity or an indication that it was a false positive, etc.). The disclosed subject matter may then train a machine learning model (e.g., local machine learning model 122) using one or more of these items of information as inputs. The local machine learning model may optionally emit an alert ranking such that the events that are most highly ranked are those that are most likely to evoke a response. Additionally or alternatively, the local machine learning model may emit a label or a score for a security alert indicating a measurement of how likely that customer is to respond to the security alert.

In some examples, the local machine learning model is interpretable and/or not prone to the explicit encoding of personally identifiable information and/or any other sensitive or confidential information. Some examples of suitable machine learning algorithms or protocols may include (i) generalized additive models, naive Bayes models, and/or linear regression models. In contrast, one or more of the following machine learning algorithms or protocols may be unsuitable, or less suitable, with respect to protecting sensitive or confidential information: support vector machines and/or deep neural networks. More specifically, one or more of these latter machine learning algorithms or protocols may be more susceptible to membership inference attacks.

A discussion follows of training the ensembled or aggregation machine learning model. One motivation for using model ensembles is to help balance the goals of achieving personalization of security alert products to the needs of the individual customer. Additionally, another goal for using model ensembles is helping the customers to benefit from the wisdom of their peers. To establish a peer group for customers, the disclosed subject matter may collect metadata about the sector in which the customer operates and additional information to describe each customer. Examples of this descriptive metadata may include a WIKIPEDIA article for a company and/or a response to a customer survey. In addition, the tuned or learned parameters of the models themselves (e.g., the local machine learning model and/or a peer machine learning model shown in FIG. 2), when compared, can reveal similarities between customers. Additionally or alternatively, basic statistics about items of information, such as the customers incident response rates, can be used to identify whether security alert volumes are overwhelming and/or underwhelming for the customer. In further examples, direct feedback from the customer about one or more of the above listed items of information or attributes may be requested and/or obtained by a module, such as identification module 104. The disclosed subject matter may then optionally use this collected customer metadata to create a similarity metric or model that indicates a level of similarity between different customers.

In view of the above, a final ensemble machine learning model can be used by the disclosed subject matter, such as protection module 110, to rank the security alerts that are sent to each customer. This ensemble or aggregated machine learning model can be a combined model that includes the customer's personalized model (e.g., local machine learning model 122) and/or includes one or more personalized models of the top K customers that are most similar to the original client according to the similarity metric, as further discussed above (e.g., where K is an arbitrary or predefined cutoff). In some examples, the alert rankings produced by the top K models are combined with the alert rankings produced by the customer's personalized model, which vote together to identify the customer's most important alerts. In further examples, the influence of each of the top K models is optionally weighted based on their respective similarity to the customer in question. A nice outcome of this approach is that the disclosed subject matter can use customer metadata to immediately provide new customers with tailored alert prioritization based on the wisdom of their peers, otherwise personalization could potentially not be achieved in a product trial period due to the absence of customer-response data, as further discussed above.

A discussion follows of how the disclosed subject matter may improve upon related subject matter. One concept underlying the disclosed subject matter comes from the emerging field of "federated learning." Nevertheless, federated machine learning has not yet been applied in a security context. Additionally, related systems may treat the entire customer base uniformly, rather than attempting to personalize security rankings and/or taking a notion of peers into account. Moreover, these related systems generally presuppose a centralized data set and therefore will not work in a distributed setting, as further discussed above.

Figure 5:
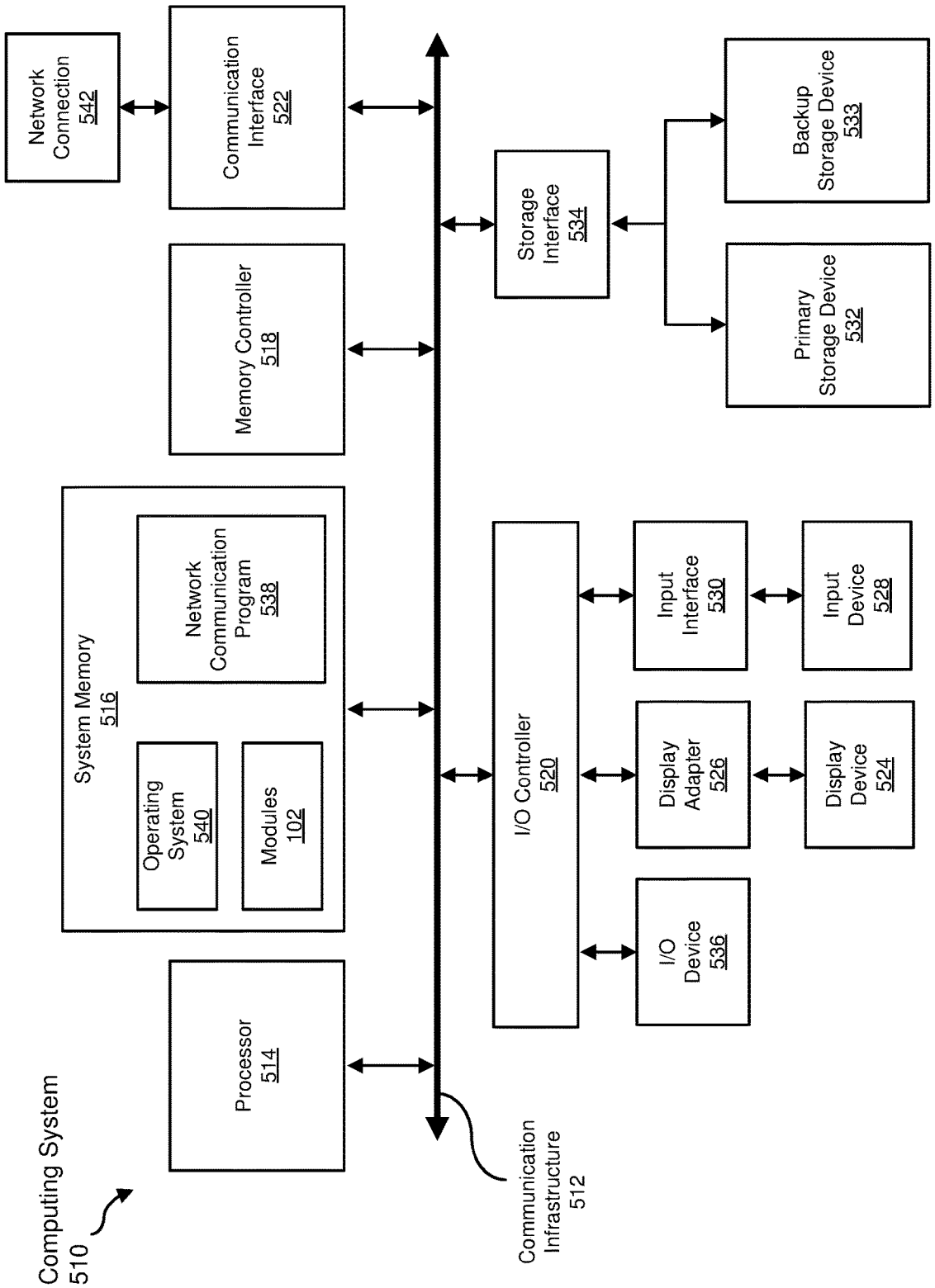
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536.

In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
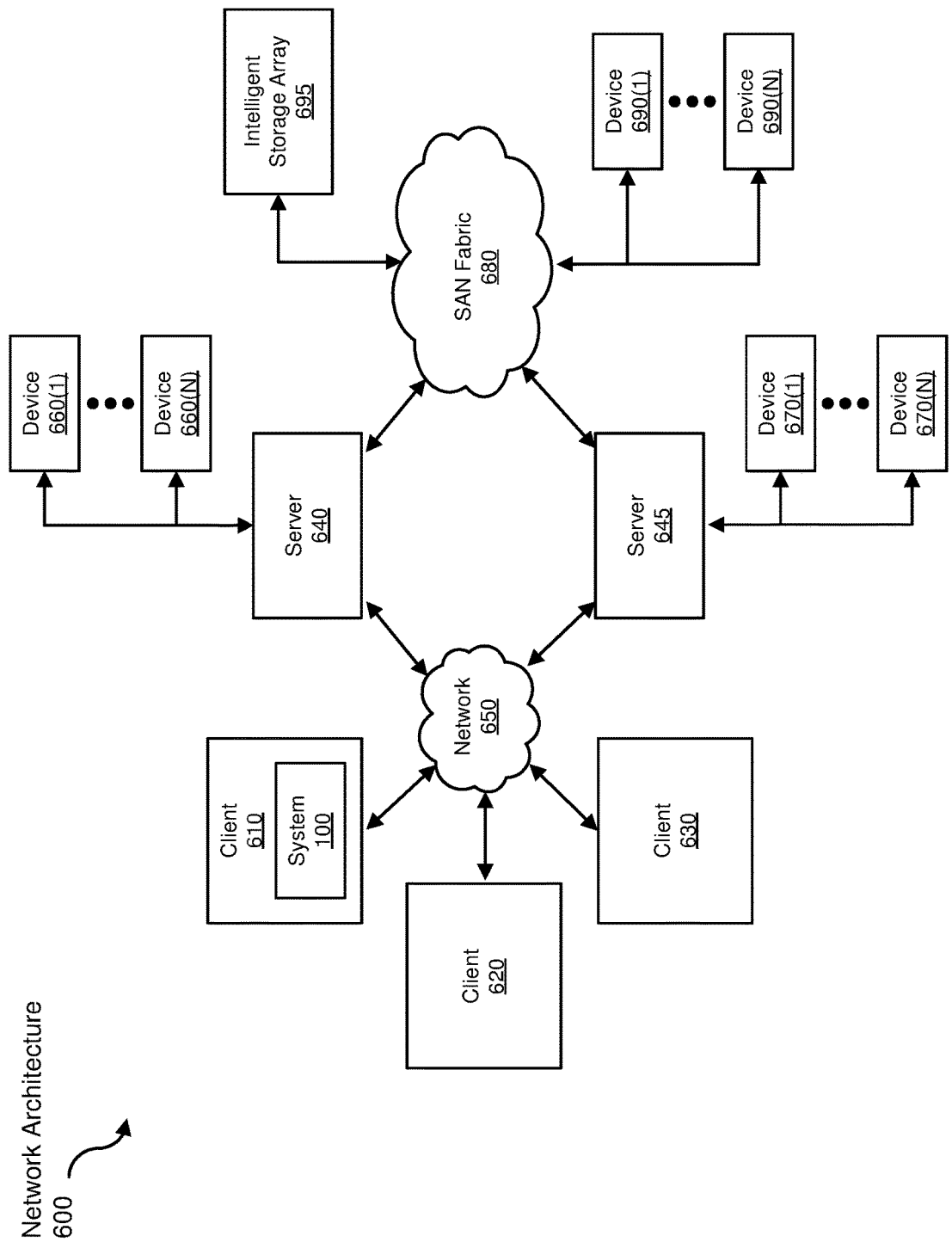
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for customizing security alert reports.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules disclosed herein may receive multiple machine learning models, and transform the models by aggregating them, in accordance with method 300, as discussed further above. Additionally, one or more of the modules disclosed herein may protect a client from a corresponding security threat by customizing a security alert report and/or performing a security action in response to the security alert report, as further discussed above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for customizing security alert reports, at least a portion of the method being performed by a computing device comprising at least one processor, the method comprising:

identifying a local machine learning model that predicts how a client responds to security alerts generated for the client;

identifying a set of peer machine learning models that predict how a set of peers of the client each responds to security alerts generated for each respective peer;

measuring a level of similarity between the client and each respective peer of the set of peers according to a similarity metric to create a similarity model;

aggregating the local machine learning model and at least one of the set of peer machine learning models based on the similarity model to create an aggregated machine learning model; and protecting the client by applying the aggregated machine learning model to customize an electronically displayed security alert report generated for the client;

wherein the local machine learning model and the at least one of the set of peer machine learning models vote, within the aggregated machine learning model, on whether to highlight a security alert to the client.

2. The computer-implemented method of claim 1, wherein the local machine learning model is trained using training data that comprises:

data describing security alerts generated for the client; and data describing how the client responded to the security alerts generated for the client.

3. The computer-implemented method of claim 2, wherein the data describing how the client responded to the security alerts generated for the client comprises at least one of:

data designating a response action performed in response to each respective security alert;

data describing an amount of time taken by the client to perform the response action; and data describing feedback that the client provided to a security analyst.

4. The computer-implemented method of claim 3, wherein the data describing feedback that the client provided to the security analyst comprises at least one of:

data indicating a level of severity for a corresponding security alert; and data indicating whether the corresponding security alert was a false positive.

5. The computer-implemented method of claim 1, wherein the local machine learning model predicts how the client responds to security alerts generated for the client by ranking security alerts such that a higher ranking of a specific security alert indicates a higher likelihood that the client will respond to the specific security alert.

6. The computer-implemented method of claim 1, wherein the local machine learning model excludes any information that has been categorized as sensitive for the client.

7. The computer-implemented method of claim 6, wherein the information that has been categorized as sensitive for the client includes personally identifiable information.

8. The computer-implemented method of claim 1, wherein the local machine learning model comprises at least one of:

a generalized additive machine learning model;

a naïve Bayes machine learning model; and a linear regression machine learning model.

9. The computer-implemented method of claim 1, further comprising performing a security action to protect the client in response to the electronically displayed security alert report customized by the aggregated machine learning model.

10. The computer-implemented method of claim 1, wherein the similarity metric measures the level of similarity between the client and each respective peer of the set of peers along at least one of these dimensions:
- information indicating a sector in which the client operates;
- public information extracted from the Internet that describes the client;
- a response rate of the client; and
- an indication of whether the client is underwhelmed or overwhelmed by security alerts.

11. The computer-implemented method of claim 1, wherein a level of influence, within the aggregated machine learning model, of each one of the set of peer machine learning models aggregated with the local machine learning model is proportional to the measured level of similarity between the client and a respective peer.

12. The computer-implemented method of claim 1, wherein aggregating the local machine learning model comprises aggregating the local machine learning model with a defined number of the set of peer machine learning models that are ranked highest in terms of similarity between the client and each respective peer according to the similarity model.

13. The computer-implemented method of claim 1, wherein either the aggregated machine learning model overall votes yes on a specific security alert due to a majority of underlying votes voting yes or the aggregated machine learning model overall votes no on the specific security alert due to the majority of underlying votes voting no.

14. The computer-implemented method of claim 1, wherein a vote of each underlying machine learning model is weighted in proportion to a corresponding weight listed within metadata.

15. The computer-implemented method of claim 1, wherein the aggregated machine learning model enables the client to benefit from wisdom of the set of peers of the client without exposing data that has been categorized as confidential.

16. A system for customizing security alert reports, the system comprising:
- an identification module, stored in memory, that:
  - identifies a local machine learning model that predicts how a client responds to security alerts generated for the client; and
  - identifies a set of peer machine learning models that predict how a set of peers of the client each responds to security alerts generated for each respective peer;
- a measurement module, stored in memory, that measures a level of similarity between the client and each respective peer of the set of peers according to a similarity metric to create a similarity model;
- an aggregation module, stored in memory, that aggregates the local machine learning model and at least one of the set of peer machine learning models based on the similarity model to create an aggregated machine learning model;
- a protection module, stored in memory, that protects the client by applying the aggregated machine learning model to customize an electronically displayed security alert report generated for the client; and
- at least one physical processor configured to execute the identification module, the measurement module, the aggregation module, and the protection module;
- wherein the local machine learning model and the at least one of the set of peer machine learning models are configured to vote, within the aggregated machine learning model, on whether to highlight a security alert to the client.

17. The system of claim 16, wherein the local machine learning model is trained using training data that comprises:
- data describing security alerts generated for the client; and
- data describing how the client responded to the security alerts generated for the client.

18. The system of claim 17, wherein the data describing how the client responded to the security alerts generated for the client comprises at least one of:
- data designating a response action performed in response to each respective security alert;
- data describing an amount of time taken by the client to perform the response action; and
- data describing feedback that the client provided to a security analyst.

19. The system of claim 18, wherein the data describing feedback that the client provided to the security analyst comprises at least one of:
- data indicating a level of severity for a corresponding security alert; and
- data indicating whether the corresponding security alert was a false positive.

20. A non-transitory computer-readable medium comprising one or more computer-readable instructions that, when executed by at least one processor of a computing device, cause the computing device to:
- identify a local machine learning model that predicts how a client responds to security alerts generated for the client;
- identify a set of peer machine learning models that predict how a set of peers of the client each responds to security alerts generated for each respective peer;
- measure a level of similarity between the client and each respective peer of the set of peers according to a similarity metric to create a similarity model;
- aggregate the local machine learning model and at least one of the set of peer machine learning models based on the similarity model to create an aggregated machine learning model; and
- protect the client by applying the aggregated machine learning model to customize an electronically displayed security alert report generated for the client;
- wherein the local machine learning model and the at least one of the set of peer machine learning models vote, within the aggregated machine learning model, on whether to highlight a security alert to the client.

* * * * *